(12) United States Patent
Broderick et al.

(10) Patent No.: US 8,543,148 B2
(45) Date of Patent: Sep. 24, 2013

(54) WIRELESS ASSESSMENT ADMINISTRATION SYSTEM AND PROCESS

(75) Inventors: Michael Broderick, Aurora, OH (US); Tina Rooks, Orlando, FL (US); David Chiszar, Naperville, IL (US)

(73) Assignee: Turning Technologies, LLC, Youngstown, OH (US)

( * ) Notice: Subject to any disclaimer, the term of this patent is extended or adjusted under 35 U.S.C. 154(b) by 0 days.

(21) Appl. No.: 13/544,117

(22) Filed: Jul. 9, 2012

(65) Prior Publication Data

US 2013/0012136 A1    Jan. 10, 2013

Related U.S. Application Data

(60) Provisional application No. 61/505,834, filed on Jul. 8, 2011.

(51) Int. Cl.
*H04B 7/00* (2006.01)
*H04W 4/00* (2009.01)

(52) U.S. Cl.
USPC .................. 455/500; 455/66.1; 370/328

(58) Field of Classification Search
USPC ............... 455/41.3, 500, 507, 66.1, 556.1; 370/310, 328
See application file for complete search history.

(56) References Cited

U.S. PATENT DOCUMENTS

| | | | |
|---|---|---|---|
| 7,911,966 B2* | 3/2011 | Yoo et al. | 370/252 |
| 7,941,125 B2* | 5/2011 | Chambers et al. | 455/414.1 |
| 2004/0014460 A1* | 1/2004 | Moroo et al. | 455/414.1 |
| 2004/0214570 A1* | 10/2004 | Zhang et al. | 455/426.2 |
| 2008/0261657 A1* | 10/2008 | Amit | 455/558 |
| 2009/0186656 A1* | 7/2009 | Jain | 455/558 |

(Continued)

FOREIGN PATENT DOCUMENTS

| | | |
|---|---|---|
| JP | 2003271750 | 9/2003 |
| JP | 2004093915 | 3/2004 |
| JP | 2005215023 | 8/2005 |
| JP | 2006251582 | 9/2006 |

OTHER PUBLICATIONS

Written Opinion from the Authorized Searching Authority (corresponding to Application: PCT/US2012/045907); Korean Intellectual Property Office; Authorized Officer Ryu, Tae Young; Issued Jan. 31, 2013 (4 pages).

(Continued)

*Primary Examiner* — Andrew Wendell
(74) *Attorney, Agent, or Firm* — Benesch Friedlander; Coplan & Aronoff, LLP (57) ABSTRACT

A wireless assessment system includes a plurality of response devices, including at least one plug-in device in signal communication with a subject computer station. The at least one plug-in device is configured to receive subject response data from the subject computer station. The at least one plug-in device has a computer-readable medium, a radio frequency transceiver, a plug-in device operating system, and logic. The plug-in device operating system is configured to block a subject from accessing an operating system of the subject computer station. The logic is configured to store the subject response data in the computer-readable medium. The logic is further configured to instruct radio frequency transceiver to wirelessly transmit the subject response data. The system further includes at least one base unit having a base unit radio frequency transceiver configured to receive the subject response data from the at least one plug-in device.

20 Claims, 4 Drawing Sheets

(56) References Cited

U.S. PATENT DOCUMENTS

| | | | |
|---|---|---|---|
| 2010/0026816 A1* | 2/2010 | Bergstrom et al. | 348/207.11 |
| 2010/0173644 A1* | 7/2010 | Koyanagi | 455/453 |
| 2011/0108440 A1* | 5/2011 | Wu et al. | 205/792 |
| 2012/0040609 A1* | 2/2012 | Griffin et al. | 455/41.1 |
| 2012/0264100 A1* | 10/2012 | Rogers et al. | 434/350 |

OTHER PUBLICATIONS

International Search Report of the Authorized Searching Authority (corresponding to Application: PCT/US2012/045907); Korean Intellectual Property Office; Authorized Officer Ryu, Tae Young; Issued Jan. 31, 2013 (3 pages).

* cited by examiner

WIRELESS ASSESSMENT ADMINISTRATION SYSTEM AND PROCESS

CROSS-REFERENCE TO RELATED APPLICATIONS

This application claims priority from U.S. Provisional Application No. 61/505,834 filed on Jul. 8, 2011, the disclosure of which is hereby incorporated by reference in its entirety.

FIELD OF INVENTION

The present disclosure relates to the field of testing and assessment administration. More particularly, the present disclosure relates to a wireless system and method for administering a test, transferring, and assessing the results.

BACKGROUND

Tests, such as standardized tests and high stakes tests, are administered in a testing center. Multiple choice and true-false tests may be administered with paper sheets having a plurality of ovals that represent possible answers. A subject selects the answer by filling in the designated oval using a pen or pencil. An optical reader may then be used to read the answers and compare them to an answer document for scoring. In other known embodiments, subjects enter answers into a computer.

SUMMARY OF THE INVENTION

In one embodiment, a wireless assessment system includes at least one handheld response unit having a handheld unit radio frequency transceiver. The handheld response unit includes a handheld unit input configured to receive handheld unit response data from a subject, a handheld unit computer-readable medium, and handheld unit logic. The handheld unit logic is configured to store handheld unit response data in the handheld unit computer-readable medium and is further configured to instruct the handheld unit radio frequency transceiver to wirelessly transmit the handheld unit response data. The system further includes at least one plug-in device in signal communication with a subject computer station. The at least one plug-in device is configured to receive computer station response data from the subject computer station. The at least one plug-in device has a plug-in device computer-readable medium, a plug-in device radio frequency transceiver, and plug-in device logic. The plug-in device logic is configured to store the computer station response data in the plug-in device computer-readable medium and is further configured to instruct the plug-in device radio frequency transceiver to wirelessly transmit the computer station response data. The system also includes at least one base unit having a base unit computer-readable medium, a base unit radio frequency transceiver, and base unit logic. The base unit radio frequency transceiver is configured to receive the handheld unit response data from the at least one handheld response unit and the computer station response data from the at least one plug-in device. The base unit logic is configured to store the handheld device response data and the computer station response data on the base unit computer readable medium. The base unit is further configured to transmit the handheld unit response data and the computer station response data to a remote computer station.

In another embodiment, a wireless assessment system includes a plurality of response devices, including at least one plug-in device in signal communication with a subject computer station. The at least one plug-in device is configured to receive subject response data from the subject computer station. The at least one plug-in device has a computer-readable medium, a radio frequency transceiver, a plug-in device operating system, and logic. The plug-in device operating system is configured to block a subject from accessing an operating system of the subject computer station. The logic is configured to store the subject response data in the computer-readable medium. The logic is further configured to instruct radio frequency transceiver to wirelessly transmit the subject response data. The system further includes at least one base unit having a base unit radio frequency transceiver configured to receive the subject response data from the at least one plug-in device.

In yet another embodiment, a wireless assessment system includes at least one handheld response unit having a handheld unit radio frequency transceiver. The at least one handheld response unit is configured to receive handheld unit response data from a subject, store the handheld unit response data, and wirelessly transmit the handheld unit response data. The system further includes at least one plug-in device having a plug-in device radio frequency transceiver. The at least one plug-in device is configured to receive computer station response data from the subject computer station, store the computer station response data, and wirelessly transmit the computer station response data. The system also includes at least one base unit having a base unit radio frequency transceiver. The at least one base unit is configured to receive a start polling command from a user, wirelessly receive the handheld unit response data from the at least one handheld response unit and the computer station response data from the at least one plug-in device after receiving the start polling command. The at least one base unit is further configured to receive a stop test command and wirelessly transmit a stop test signal. The at least one handheld response unit is further configured to cease receiving handheld unit response data from a subject upon receipt of the stop test signal. The at least one plug-in device is further configured to cease receiving computer station response data from a subject upon receipt of the stop test signal.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein.

An "answer document" is a list of questions and question type which may or may not include correct answer indicators.

An "assessment," "exam," or "examination" is any single or group of questions.

"Computer-readable medium," refers to any tangible medium that participates directly or indirectly in providing signals, instructions and/or data to one or more processors for execution. Such a medium may take many forms, including but not limited to, non-volatile media and volatile media. Non-volatile media may include, for example, optical disks, magnetic disks or so-called "memory sticks." Volatile media may include dynamic memory. Transmission media may include coaxial cables, copper wire, and fiber optic cables. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, an EEPROM, a FLASH-EPROM, any other memory chip or cartridge, or any other tangible medium from which a computer, a processor or other electronic device can read.

A "computer station" is any electronic device that has an operating system and includes, without limitation, desktop computers, laptop computers, tablets, mobile telephones, and other handheld devices.

"Content," is any digital media.

"Logic," includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

A "portal" is a web based application with a database.

A "proctor" is a user, including both human users and computer or mechanic users, that administers the assessment.

A "subject" is a participant recording answer choices for the assessment.

A "test booklet" includes paper or digital copy of question items, and questions displayed by other means, such as by an overhead projector or digital display, as well as questions that are audibly presented.

A "test administrator" is an entity administering the exam or assessment and managing the proctors. Test administrators may include a school or educational facility, an employer, a government institution, or other entity.

A "test publisher" is an entity that creates the test booklet.

A "user" is a person or machine that employs the system in any capacity.

The definitions include various examples and/or forms of components that fall within the scope of a term and that may be used for implementation. The examples are not intended to be limiting. Both singular and plural forms of terms may be within the definitions.

Figure 1:
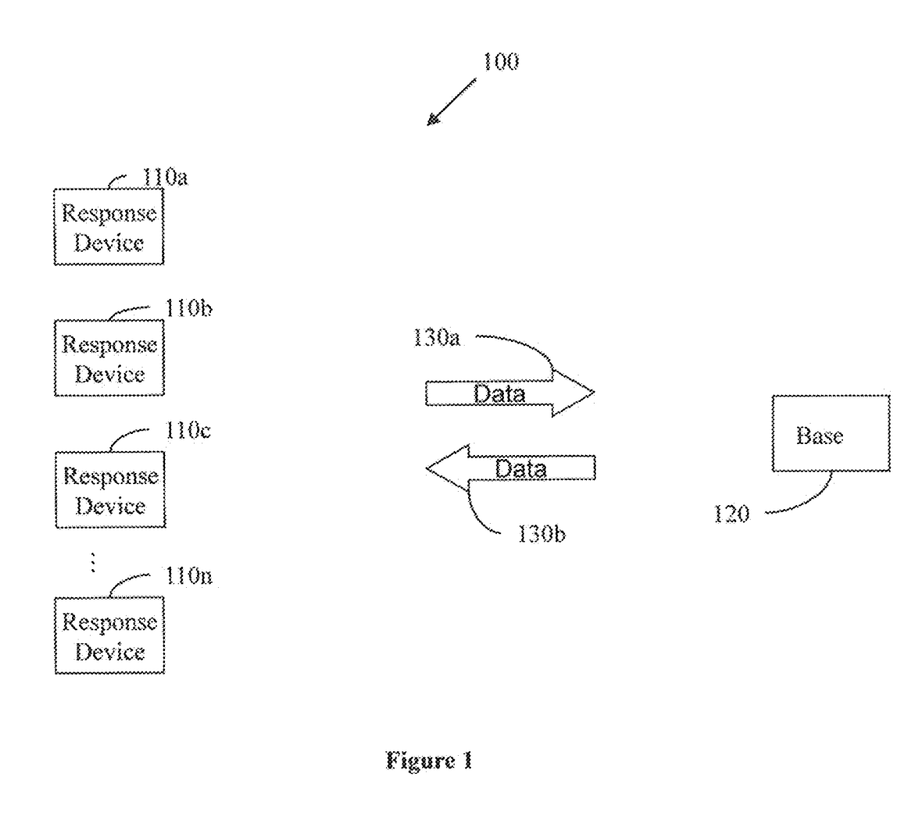
FIG. 1 is a schematic drawing of a wireless assessment system.

FIG. 1 illustrates a wireless assessment system 100 that includes a plurality of response devices 110 and at least one base unit 120. The response devices 110 transmit data 130a to the base unit 120, which in turn wirelessly transmits data 130b to the plurality of response devices 110. In one known embodiment, the base unit 110 and response devices 120 communicate by radio frequency (RF) transmission.

Figure 2:
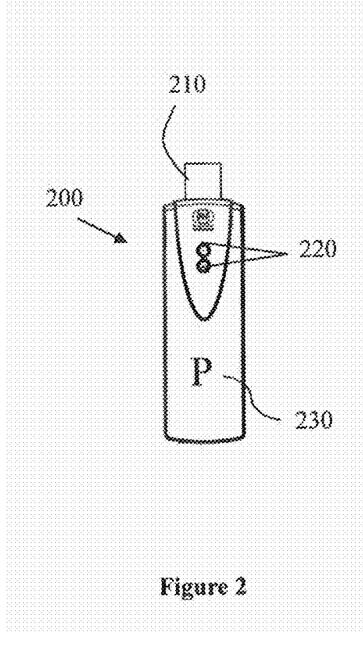
FIG. 2 is a front view of one embodiment of a base unit for a wireless assessment system.

FIG. 2 illustrates an exemplary base unit 200. The base unit 200 is a surface mount RF transmitter, and includes an interface 210 configured to send and receive signals to a computer. The base unit 200 further includes a transceiver (not shown) configured to communicate wirelessly with response devices. The base unit 200 also includes indicator lights 220 that may indicate a power status, a send/receive status, or a malfunction status. In an alternative embodiment (not shown), the base unit does not include indicator lights. In another alternative embodiment (not shown), the base unit is not a surface mount unit, but is a standalone unit.

In the illustrated embodiment, the base unit 200 further includes indicia 230 that identifies it as being configured for use by a proctor in an assessment. The indicia 230 may include alpha-numeric characters, symbols, colors, or any other such indicia. Alternatively, the base unit may have an exterior design that identifies it as being configured for use by a proctor in an assessment, rather than another plug-in device, such as a plug-in device configured only for data storage or a plug-in device configured for use by a subject in an assessment.

The base unit 200 further includes stored assessment content and logic. The base unit 200 is in communication with a computer station (not shown) which can display the content using a monitor and receive input from a keyboard or other input device. In one embodiment, the base unit 200 boots separately from the computer station operating system and may not allow the user to access the computer station operating system. In one such embodiment, the base unit boots prior to the booting of the base computer station operating system. In an alternative embodiment, the base unit boots after the booting of the base computer station operating system.

In one embodiment, the base unit 200 is configured to be cross-platform compatible. That is, the base unit 200 may be employed with computer stations using different operating systems (e.g., WINDOWS, MACINTOSH, LINUX, etc.). In an alternative embodiment (not shown), the base unit may be a stand alone device that does not interface with a computer station. In such an embodiment, the base unit may include an output, such as a display, and an input, such as a keyboard.

The base unit 200 may include an encrypted data protocol and a computer-readable medium with file storage capabilities. Alternatively, the base unit may not have any file storage capabilities. For example, in military, high security, or international embodiments, file storage may not be desirable on the base unit.

The base unit 200 will have the proctor logic stored thereon and will require a valid proctor login. In one embodiment, pre-stored logic will only connect to the response device in a "high stakes" modality. The base unit 200 may be connected to a computer station that runs the proctor logic and allows a proctor to view the subject status window. The base unit 200 or the computer station may use an Internet connection or other network connection (such as a LAN, WAN, or other network) to access a web based portal. The portal can be accessed for data transfer or data can be stored on the computer-readable medium of the base unit if an Internet or other network connection is not available.

Figure 3:
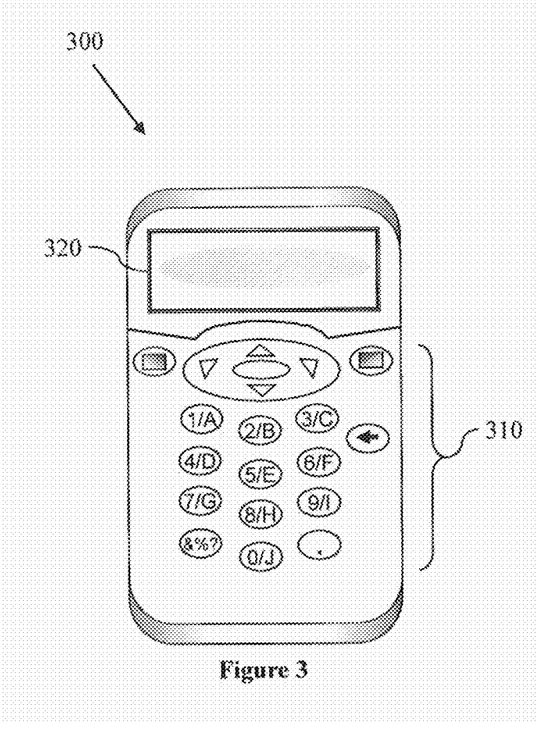
FIG. 3 is a front view of one embodiment of a response device for a wireless assessment system.

Response devices may include handheld response units, such as the handheld response unit 300 illustrated in FIG. 3. In the illustrated embodiment, the handheld response unit 300 includes a user input 310, a display 320, a wireless transceiver (not shown) configured to communicate with a base unit, and a computer-readable medium for data storage.

Figure 4:
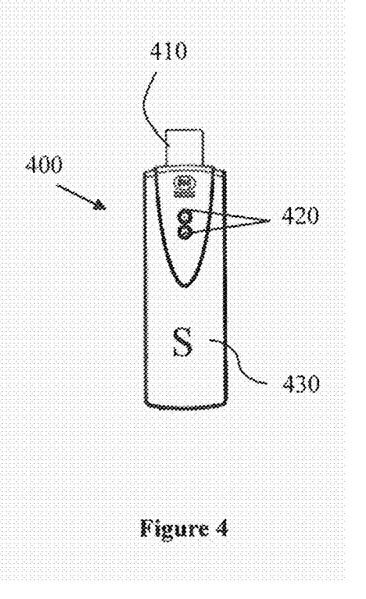
FIG. 4 is a front view of an alternative embodiment of a response device for a wireless assessment system.

Response devices may further include a computer station having a plug-in device, such as the plug-in device 400 illustrated in FIG. 4. The plug-in device 400 includes an interface 410 configured to send and receive signals to a computer station (not shown). The plug-in device 400 also includes a transceiver (not shown) configured to wirelessly communicate with a base unit, and a computer-readable medium (not shown) for data storage. The plug-in device 400 further includes indicator lights 420 that indicate a power status, a send/receive status, or a malfunction status. In an alternative embodiment (not shown), the plug-in device does not include indicator lights.

In the illustrated embodiment, the plug-in device 400 further includes indicia 430 that identifies the plug-in device as being configured for use by a subject in an assessment. The indicia 430 may include alpha-numeric characters, symbols, colors, or any other such indicia. Alternatively, the plug-in device may have an exterior design that identifies the plug-in device as being configured for use by a subject in an assessment, rather than another plug-in device, such as a plug-in device configured only for data storage or a plug-in device configured for use by a proctor in an assessment.

An exemplary plug-in device is a surface mount RF transmitter that includes stored assessment content and logic. The plug-in device 400 may be in communication with a computer station which can display content on a monitor and receive input from a keyboard or other input device. In one embodiment, the plug-in device may boot separately from the computer station operating system and may not allow a subject to access the computer station operating system.

In one embodiment a system may include at least one base unit and only a plurality of handheld response units 300. In an alternative embodiment, the system may include at least one base unit and only a plurality of plug-in devices 400. In another alternative embodiment, the system may include at least one base unit and both a plurality of handheld response units 300 and a plurality of plug-in devices 400.

In all embodiments, a response device may include multiple firmware loads. In one embodiment, the response device will not display assessment content (e.g., test questions). Instead, subjects may use a test booklet to read the assessment content while recording responses to the response device. In an alternative embodiment, the response device displays both the assessment content and the answer choices.

Figure 5:
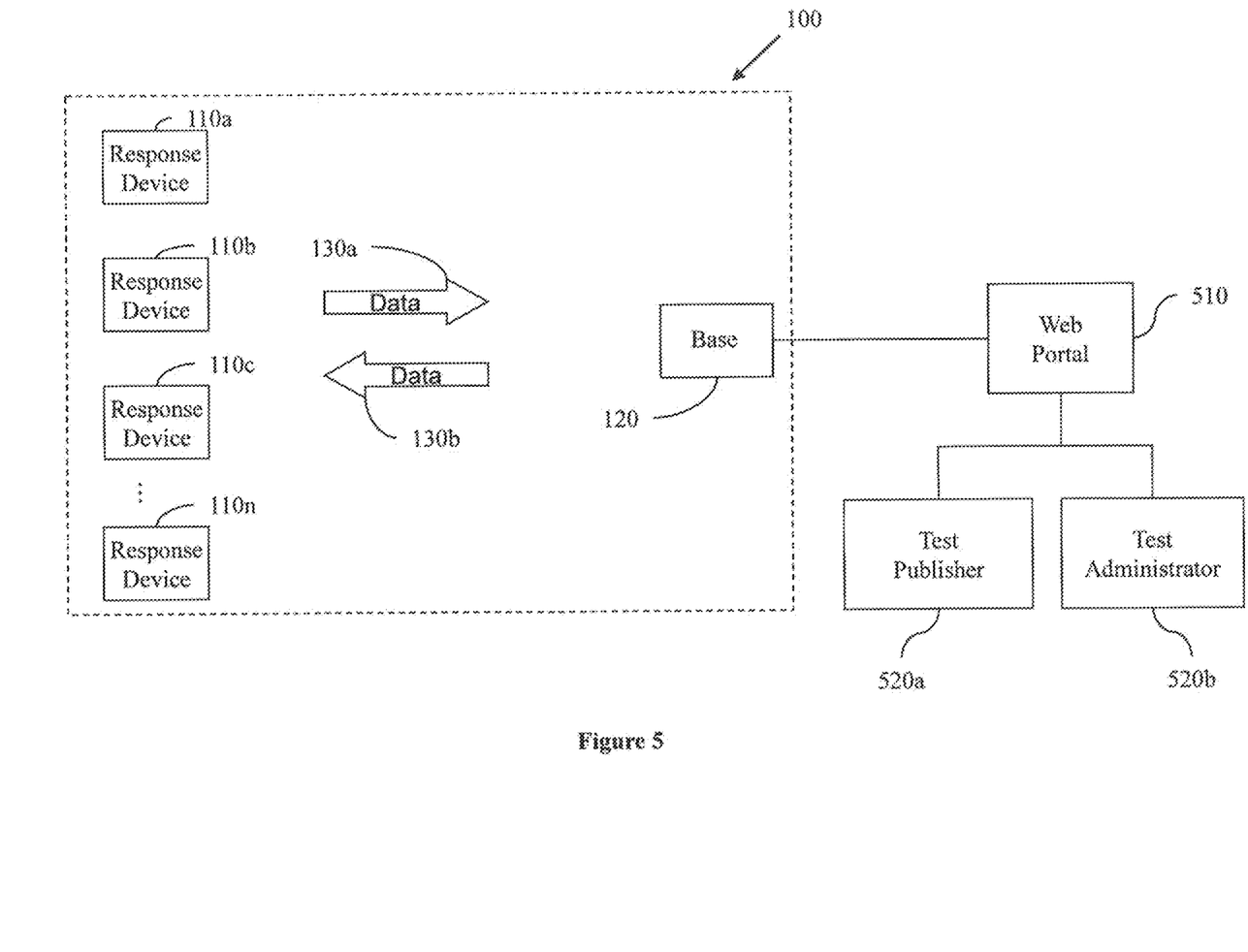
FIG. 5 is a schematic drawing of one embodiment of a wireless assessment and administration system.
Figure 6:
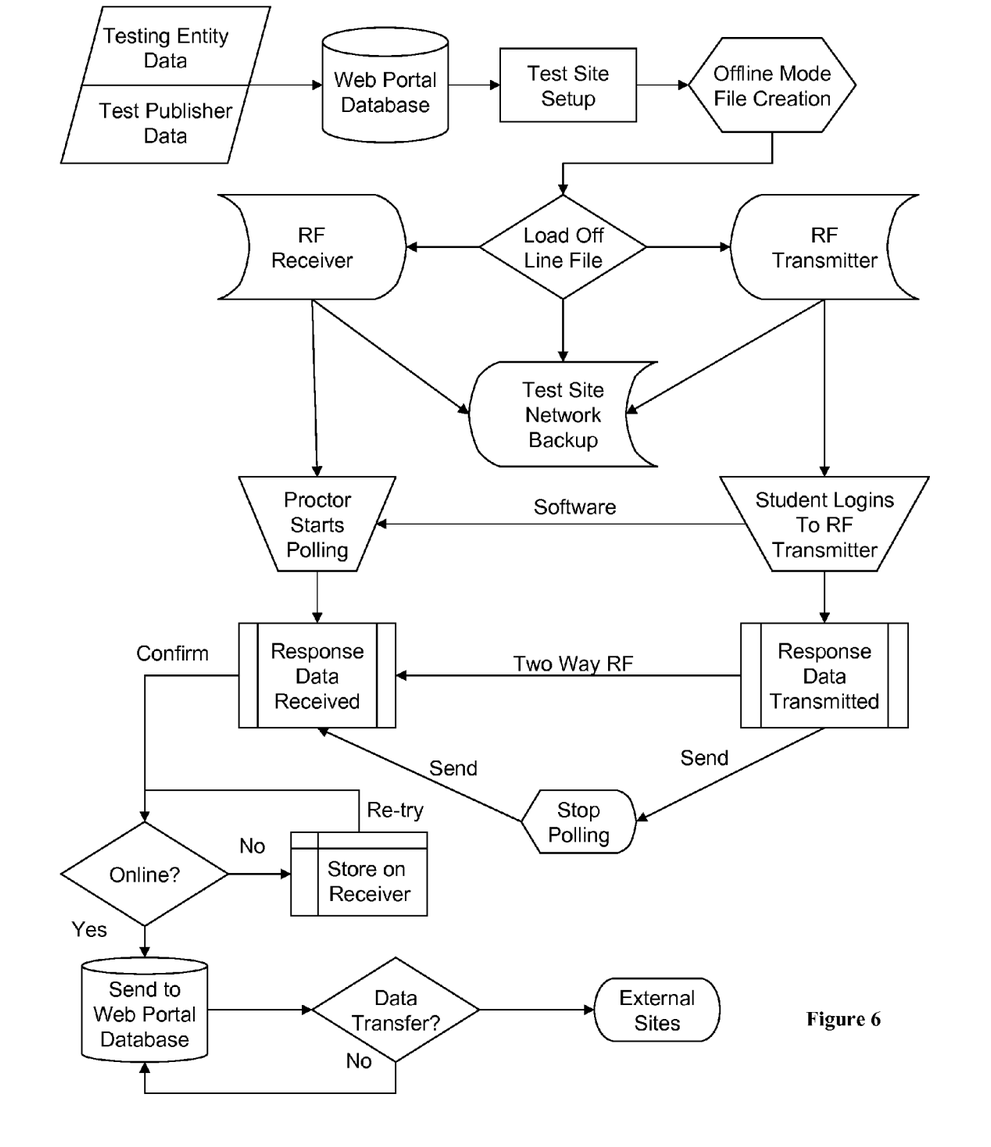
FIG. 6 is a flow chart illustrating one embodiment of a wireless assessment administration process.

FIG. 5 illustrates one embodiment of an exemplary assessment administration system 500 including the assessment system 100 and a web portal 510 that is in communication with the base unit 120 and one or more servers 520. In one known embodiment, an assessment is set up by a test publisher 520a and a test administrator 520b. A test publisher 520a may transmit test content to the web portal database 510. A test administrator 520b may transmit data to the web portal 510 that identifies and otherwise describes test sites, proctors, and subjects. The subjects may provide additional data. The subjects may transmit such data directly to the web portal 510, or it may provide the data to the test administrator 520b, which in turn transmits the data to the web portal 510. The web portal 510 may be used to set up the testing site digital data and keys.

A proprietary file may be created for each testing site using the web based portal 510 which can be used to enable an offline deliver mode. This proprietary file may include any or all of the following data sets: subject data, proctor data, test site data, assessment content, response data, time stamp data and miscellaneous data determined to be necessary for the testing process. The proprietary file will be encrypted and can be stored on the computer-readable medium of the base unit 120, the response devices 110, and optionally on the test site network. The proprietary file may also be transmitted to and from the base unit 120, response devices 110, and the test site network.

Exemplary subject data includes usernames, passwords, IDs, roles, and associated test groups. For security purposes, a second layer of encryption may be applied to usernames and passwords. Additional encryption may also be applied to content and item response data.

Exemplary test site data includes test types and their corresponding order, a list of test administrators, test groups (e.g., classrooms), proctor identification, a participant list (e.g., a class roster), and answer document files. Additional test site data may include seating charts. Seating charts may be determined in advance of the assessment or may be created at the time of the assessment. Seating charts may aid in identifying potential cheating situations.

The "Offline Mode" may be a compressed zip file containing the following information that can then be consumed by the proctor logic or subject logic.

In one exemplary embodiment, when a user runs the application, she will enter in her credentials and the application will decrypt the User Account Credentials file and look for a match. If the user is valid, it will then reference this User's Role and Associated Test Group information.

For example, in the case where a subject logs in, the application would first validate that subject's "Username" and/or "Password" and then reference the "Role." Upon determining that the "Role" is set to that of type "Student," the application would then reference the "Associated Test Group" to find which classroom the user is in. Logic would then decrypt all of the corresponding Answer Document files associated with that Test Group and prepare the session to begin polling.

It should be understood that in certain assessments, it will be necessary to identify each subject. In such an embodiment, each response device 110 will require a subject to login or register at the start of the assessment. The login must match a predefined code or response device. Such an embodiment may be referred to as a "registered embodiment." The response devices 110 may be "pre-slugged" with subject data. The subject using the response device 110 will be prompted to enter a login on the response device. In one embodiment, the student is prompted to verify that the student's name and test name at the time of login. The response device 110 will then be placed in a "waiting for test to start" mode, and remain in the waiting mode until the proctor beings the test. During testing, each response device 110 will continuously stream the response data to the base unit and will back up the data on the response device and the base unit.

It should also be understood that in certain other assessments, anonymity is desired. In such instances, the subject is disassociated from the device. Such an embodiment may be referred to as an "anonymous embodiment." The disassociation may be performed by the response device or by the base unit.

In other assessments, the pre-assignment or registration of the subject may not be required ahead of time, but complete anonymity may not be required either. In such an embodiment, a subject may be paired with any response device. Such an embodiment may be referred to as an "ad hoc embodiment."

In one embodiment, subjects may be assigned different assessments, or different versions of the same assessment. For example, where subjects are sitting next to each other, and taking the same assessment, each subject may be presented the same questions, but in a different order. In another example, one subject may be taking a math test, and another subject taking an English test during the same time, with each test having a same or different time limit. In such embodiments, the response device is configured to receive answers for the appropriate test during the validation process.

Assessments may be created as a single set of questions or in test bundles. Test bundles include multiple tests that are associated with a test event. Assessments and test bundles may or may not be associated with an administration date range. If an assessment is associated with a test date range, the assessment will only be available in the pre-set date range.

As one of ordinary skill in the art would understand, it may be desirable for an assessment to include multiple types of questions, including, without limitation: multiple choice questions, true/false questions, short answer questions, constructed response questions, and essay questions. It should be understood that an assessment may include one or more types of questions, and that each subject may use the same response device 110 throughout the assessment. Similarly, the assessment may include one or more types of question and the same base unit 120 may be used throughout the assessment.

In practice, assessments having multiple choice questions may provide different alphanumeric choices for different questions. For example, odd number questions may present choices represented by A, B, C, and D and even number questions may present choices represented by E, F, G, and H. The response devices may be configured to display the selections accordingly. In the case of a handheld device with fixed keys, an overlay may be provided for the keypad to identify the corresponding choices. For example, an overlay may identify the first key as A/E, the second key as B/F, the third key as C/G, and the fourth key as D/H. As one of ordinary skill in the art would understand, different overlays may be provided as desired.

When a proctor logs in, the application would first validate the proctor's "Username" and "Password" and then reference the "Role." In one embodiment, the proctor is prompted to login upon inserting the base unit 120 into a computer station. Upon determining that the "Role" is set to that of type "Proctor," the proctor accesses a dashboard that enables proctor activities. For example, the proctor may add digital notes during the assessment, such as notes about suspected cheaters or notes about malfunctions. Additionally, the proctor may be permitted to add subjects that arrive late to the assessment. The base unit 120 may be configured to time stamp all proctor activities.

The proctor will access the polling logic which will include a pre-loaded list of the subjects and the appropriate answer document. In one embodiment, the proctor will select a specific RF channel, and the base unit 120 will transmit the specified RF channel to the response units 110. The proctor will then select "start polling" which will instruct the base unit 120 to listen for responses.

When the test session begins, the subject will read the test questions from the test booklet and enter each selection into the response device (either using a keyboard of a computer station having a plug-in response device, or by using a key pad, touch screen, buttons, dials, or other input on a handheld response unit). The response device will send response data to the base unit. In one embodiment, the response data will be time stamped and the subject will be provided with confirmation that the response was received by the proctor. The base unit 120 may also time stamp the receipt of the data.

In one embodiment, subjects will have the ability on their response device 110 to skip questions, go directly to a specific question number and to go to unanswered questions. Subjects may be alerted via their response device to any missed questions at the time they send their final test. If time permits, students have the ability to go back and answer any missed questions.

In one embodiment, logic will enable the proctor to view a grid of each subject to confirm that they are responding. Actual response choices may or may not be displayed. On timed tests, the logic will control the closing of polling and final submission of response data. On untimed tests, the proctor will control the close of polling. Once polling is closed, the data will be saved to the computer-readable medium on the base unit and transmitted via a network connection to the web portal. If a network connection is not available, the base unit may ping the network connection until the data can be sent and the proctor will receive confirmation that the data was sent successfully. Alternatively, the data may be stored on the computer-readable medium of the base unit or subsequent login is made, with a command to transmit the data.

Once all answer choices are completed the subject can select to send the complete test data to the base unit. If the test is a timed test and time ends, a stop test mode will prevent the subject from entering additional answer choices and force a send of the data to the base unit. The subject will receive confirmation that all data was sent successfully. Additionally, in one embodiment, the base unit 120 is configured allow the proctor to stop a test and disable any additional responses from one or more response devices 110.

All subject response data will be sent to the base unit both from the handheld response devices and plug-in devices. Upon the proctor closing polling, the logic will attempt to transfer aggregate data to the web portal database. If a network connection is not available the logic will continue to ping the network until the data is transferred successfully. Alternatively, the data may be securely stored on the computer-readable medium of the base unit until a subsequent login, and command to transfer the data.

The web based portal database will store the data and process the data in order to format the data for transfer. The portal will be able to port the data to multiple external sites as designated by the test site administrator. The data transfer will be encrypted and may comply with desirable data portability standards. Missing data reports will be available. All data storage on both the RF receiver and transmitter devices will removed after data confirmation is achieved.

The data from the assessment session, including responses, time stamps, and other data, may be encrypted at various times during the assessment and the administration. The response device may encrypt the data at the time a response is input by a subject. The response device may also encrypt the data at the time the data is transmitted to the base unit. The base unit may also encrypt the data when it receives the transmission. The base unit may also encrypt the data when it transmits the data to the web portal. The servers in communication with the web portal may also encrypt the data. It should be understood that encryption may occur multiple times, and may occur at each of the times described above.

In one embodiment, after the assessment is complete, the stored data is erased from the response devices 110 and the base unit 120. In one such embodiment, the data is erased from the response devices 110 after the base unit 120 confirms receipt of all of the data, and the data on the base unit 120 is erased after the web portal 510 confirms receipt of all of the data. In an alternative embodiment, the data is erased after some period of time has elapsed, to allow for additional confirmation that all data has been received. Where certain data has not bee received, it may then be retrieved from either the base unit 110 or the response device 120. The data may be erased remotely, or by—connecting the device into a computer station.

The system also has the ability to create temporary accounts for substitute proctors, whether for short term or long term substitutes. For example, when the system is used in a classroom setting by a permanent teacher, it may be inconvenient to change rights for a substitute teacher. The system may create an account for a temporary proctor and assign the temporary proctor impersonation rights to an existing proctor account. This impersonation account may be to an inactive account, such that only one person has access to the account, or it can be to an active account to facilitate both proctors overseeing the login.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A wireless assessment system comprising:
    at least one handheld response unit having a handheld unit radio frequency transceiver, a handheld unit input configured to receive handheld unit response data from a subject, a handheld unit computer-readable medium, and handheld unit logic configured to store handheld unit response data in the handheld unit computer-readable medium;
    at least one plug-in device in signal communication with a subject computer station, wherein the at least one plug-in device is configured to receive computer station response data from the subject computer station, wherein the at least one plug-in device has a plug-in device computer-readable medium, a plug-in device radio frequency transceiver, and plug-in device logic configured to store the computer station response data in the plug-in device computer-readable medium; and
    at least one base unit having a base unit computer-readable medium, a base unit radio frequency transceiver, and base unit logic, wherein the base unit radio frequency transceiver is configured to receive the handheld unit response data from the at least one handheld response unit and the computer station response data from the at least one plug-in device, wherein the base unit logic is configured to store the handheld unit response data and the computer station response data on the base unit computer readable medium, and wherein the at least one base unit is further configured to transmit the handheld unit response data and the computer station response data to a remote computer station;
    wherein the handheld unit logic is further configured to instruct the handheld unit radio frequency transceiver to wirelessly transmit the handheld unit response data to the at least one base unit; and
    wherein the plug-in device logic is further configured to instruct the plug-in device radio frequency transceiver to wirelessly transmit the computer station response data directly to the at least one base unit.

2. The wireless assessment system of claim 1, wherein the base unit logic is configured to transmit the handheld unit response data and the computer station response data to a remote computer station over a network connection selected from the group consisting of the Internet, a local area network, and a wide area network.

3. The wireless assessment system of claim 1, wherein each of the at least one handheld response unit and the at least one plug-in device is configured to receive verification data comprising a subject name and a test name.

4. The wireless assessment system of claim 1, wherein the handheld unit input is a keypad.

5. The wireless assessment system of claim 4, further comprising an overlay configured to be removably disposed on the keypad to identify corresponding answer choices.

6. The wireless assessment system of claim 1, wherein the at least one plug-in device further includes a plug-in device operating system.

7. The wireless assessment system of claim 6, wherein the plug-in device operating system is configured to block a subject from accessing an operating system of the subject computer station.

8. A wireless assessment system comprising:
    a plurality of response devices, including at least one plug-in device in signal communication with a subject computer station, the at least one plug-in device being configured to receive subject response data from the subject computer station,
        wherein the at least one plug-in device has a computer-readable medium, a radio frequency transceiver, a plug-in device operating system, and logic,
        wherein the plug-in device operating system is configured to block a subject from accessing an operating system of the subject computer station, and
        wherein the logic is configured to store the subject response data in the computer-readable medium, and
    at least one base unit having a base unit radio frequency transceiver configured to receive the subject response data from the at least one plug-in device;
    wherein the logic is further configured to instruct the radio frequency transceiver to wirelessly transmit the subject response data directly to the at least one base unit.

9. The wireless assessment system of claim 8, wherein the plurality of response devices further include at least one handheld response unit.

10. The wireless assessment system of claim 9, wherein the at least one handheld response unit includes a handheld unit radio frequency transceiver, a handheld unit input configured to receive handheld unit response data from a subject, a handheld unit computer-readable medium, and handheld unit logic.

11. The wireless assessment system of claim 10, wherein the handheld unit logic is configured to store handheld unit response data in the handheld unit computer-readable medium and is further configured to instruct the handheld unit radio frequency transceiver to wirelessly transmit the handheld unit response data.

12. The wireless assessment system of claim 11, wherein the base unit radio frequency transceiver is further configured to receive the handheld unit response data from the at least one handheld response unit.

13. The wireless assessment system of claim 8, wherein the logic is configured to encrypt the subject response data, and wherein the at least one base unit further includes logic configured to encrypt the subject response data.

14. The wireless assessment system of claim 8, wherein the subject response data includes data associated with at least one of an answer to a multiple choice question, an answer to a true/false question, an answer to a matching question, a short answer, a constructed response, and an essay.

15. A wireless assessment system comprising:
 at least one handheld response unit having a handheld unit radio frequency transceiver, the at least one handheld response unit being configured to:
  receive handheld unit response data from a subject, and
  store the handheld unit response data;
 at least one plug-in device in signal communication with a subject computer station and having a plug-in device radio frequency transceiver, the at least one plug-in device being configured to:
  receive computer station response data from the subject computer station, and
  store the computer station response data; and
 at least one base unit having a base unit radio frequency transceiver, the at least one base unit being configured to:
 receive a start polling command from a user,
 wirelessly receive the handheld unit response data from the at least one handheld response unit and the computer station response data from the at least one plug-in device after receiving the start polling command,
 receive a stop test command, and
 wirelessly transmit a stop test signal,
 wherein the at least one handheld response unit is further configured to:
 wirelessly transmit the handheld unit response data to the at least one base unit; and
 cease receiving handheld unit response data from a subject upon receipt of the stop test signal, and
 wherein the at least one plug-in device is further configured to:
 wirelessly transmit the computer station response data directly to the at least one base unit; and
 cease receiving computer station response data from a subject upon receipt of the stop test signal.

16. The wireless assessment system of claim 15, wherein the at least one handheld response unit is further configured to transmit all stored handheld unit response data upon receipt of the stop test signal.

17. The wireless assessment system of claim 15, wherein the at least one plug-in device is further configured to transmit all stored computer station response data upon receipt of the stop test signal.

18. The wireless assessment system of claim 15, wherein the at least one base unit is further configured to transmit the handheld unit response data and the computer station response data to a remote computer station.

19. The wireless assessment system of claim 15, wherein the at least one base unit transmits a test score to the at least one handheld response unit based on the handheld unit response data.

20. The wireless assessment system of claim 15, wherein the at least one base unit transmits a test score to the at least one plug-in device based on the computer station response data.

* * * * *